United States Patent [19]
Toivola

[11] Patent Number: 6,126,052
[45] Date of Patent: Oct. 3, 2000

[54] CANOE CARRIER SYSTEM

[76] Inventor: Kevin S. Toivola, 11538 Spudville Rd., Hibbing, Minn. 55746

[21] Appl. No.: 09/307,335

[22] Filed: May 6, 1999

[51] Int. Cl.$^7$ ...................................................... B60R 9/00
[52] U.S. Cl. .......................... 224/401; 224/309; 224/421; 224/494
[58] Field of Search .................................... 224/401, 319, 224/324, 421, 425, 426, 457, 442, 488, 492, 494

[56] References Cited

U.S. PATENT DOCUMENTS

| | | | |
|---|---|---|---|
| 2,537,587 | 1/1951 | Humphrey | 224/494 |
| 3,061,256 | 10/1962 | Feinstein | 224/324 X |
| 3,338,484 | 8/1967 | Hall, Sr. | 224/437 X |
| 3,547,325 | 12/1970 | Hill | 224/457 |
| 3,737,083 | 6/1973 | Lund | 224/324 X |
| 3,848,785 | 11/1974 | Bott | 224/319 |
| 4,775,276 | 10/1988 | McMillan | 224/401 X |
| 4,826,057 | 5/1989 | Yamada | 224/401 X |
| 5,067,644 | 11/1991 | Coleman | 224/324 |
| 5,236,062 | 8/1993 | Laney | 224/401 X |
| 5,381,939 | 1/1995 | Tippets | 224/319 X |
| 5,492,259 | 2/1996 | Tippets | 224/494 |

FOREIGN PATENT DOCUMENTS

| 1004722 | 4/1952 | France | 224/319 |
|---|---|---|---|

*Primary Examiner*—Gregory M. Vidovich
*Attorney, Agent, or Firm*—Michael S. Neustel

[57] ABSTRACT

A canoe carrier system for allowing an individual to easily transport a canoe, kayak or other structure to a remote location with an all-terrain vehicle (ATV). The inventive device includes a pair of base members, a plurality of support members extending vertically from the base members, a pair of elongated members extending between the support members longitudinally, a pair of cross members attached between the support members traversely to the elongated members, and a plurality of fastener straps secured to the elongated members for surrounding a canoe or kayak. A pair of padding members are secured about cross members for protecting the canoe. A pair of fasteners and clamps are attached to each of the base members for attaching to the front rack and rear rack of the ATV.

17 Claims, 4 Drawing Sheets

CANOE CARRIER SYSTEM

BACKGROUND OF THE INVENTION

1. Field of the Invention

The present invention relates generally to racks for all-terrain vehicles (ATV) and more specifically it relates to a canoe carrier system for allowing an individual to easily transport a canoe, kayak or other structure to a remote location with an ATV.

Individuals who utilize canoes or kayaks often times have to physically transport the water craft over significant distances and uneven terrain in remote areas. This is extremely tiring and for some individuals physically impossible. Hence, there is a need for a canoe carrier system that allows an individual to utilize a conventional ATV to transport a canoe or kayak.

2. Description of the Prior Art

Racks for all-terrain vehicles have been in use for years. Typically, an ATV includes a front rack above the front tires and a rear rack above the rear tires. These racks are suitable for transporting shorter objects, however they are not as suitable for transporting an elongated object such as a canoe or kayak.

Examples of racks for vehicles include U.S. Pat. No. Des. 292,504 to Racicot; U.S. Pat. No. 3,329,323 to Tanaka; U.S. Pat. No. 3,338,484 to Hall; U.S. Pat. No. 3,547,325 to Hill; U.S. Pat. No. 4,405,170 to Raya; U.S. Pat. No. 4,603,798 to Griswold; U.S. Pat. No. 4,630,990 to Whiting; U.S. Pat. No. 5,439,152 to Campbell; U.S. Pat. No. 5,662,254 to Lemajeur et al; U.S. Pat. No. 5,743,702 to Gunderson which are all illustrative of such prior art.

Racicot (U.S. Pat. No. Design 292,504) discloses a canoe carrier for all-terrain vehicles. Racicot teaches a frame having a rear portion, a front portion and an upper portion.

Tanaka (U.S. Pat. No. 3,329,323) discloses an overhead carrier for use with two-wheeled vehicles. Tanaka teaches a front support structure mountable to the handle bars of a motorcycle and a rear support structure mountable to the frame of the motorcycle.

Hill (U.S. Pat. No. 3,547,325) discloses a bicycle surfboard rack. Hill teaches a front frame, a rear frame and an upper frame that are attachable to the bicycle for supporting a surfboard.

While these devices may be suitable for the particular purpose to which they address, they are not as suitable for allowing an individual to easily transport a canoe, kayak or other structure to a remote location with an ATV. Conventional structures and devices are not as suitable for easy attachment to an ATV and for transporting a canoe or kayak structure.

In these respects, the canoe carrier system according to the present invention substantially departs from the conventional concepts and designs of the prior art, and in so doing provides an apparatus primarily developed for the purpose of allowing an individual to easily transport a canoe, kayak or other structure to a remote location with an ATV.

SUMMARY OF THE INVENTION

In view of the foregoing disadvantages inherent in the known types of ATV racks now present in the prior art, the present invention provides a new canoe carrier system construction wherein the same can be utilized for allowing an individual to easily transport a canoe, kayak or other structure to a remote location with an ATV.

The general purpose of the present invention, which will be described subsequently in greater detail, is to provide a new canoe carrier system that has many of the advantages of the ATV racks mentioned heretofore and many novel features that result in a new canoe carrier system which is not anticipated, rendered obvious, suggested, or even implied by any of the prior art ATV racks, either alone or in any combination thereof.

To attain this, the present invention generally comprises a pair of base members, a plurality of support members extending vertically from the base members, a pair of elongated members extending between the support members longitudinally, a pair of cross members attached between the support members traversely to the elongated members, and a plurality of fastener straps secured to the elongated members for surrounding a canoe or kayak. A pair of padding members are secured about cross members for protecting the canoe. A pair of fasteners and clamps are attached to each of the base members for attaching to the front rack and rear rack of the ATV.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a canoe carrier system that will overcome the shortcomings of the prior art devices.

Another object is to provide a canoe carrier system that easily transports a canoe, kayak or other elongated object upon an ATV.

An additional object is to provide a canoe carrier system that eliminates the physically demanding task of transporting a water craft to a remote area.

A further object is to provide a canoe carrier system that is easily attached and removed from a conventional ATV.

Another object is to provide a canoe carrier system that does not interfere with the normal operation of the ATV.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
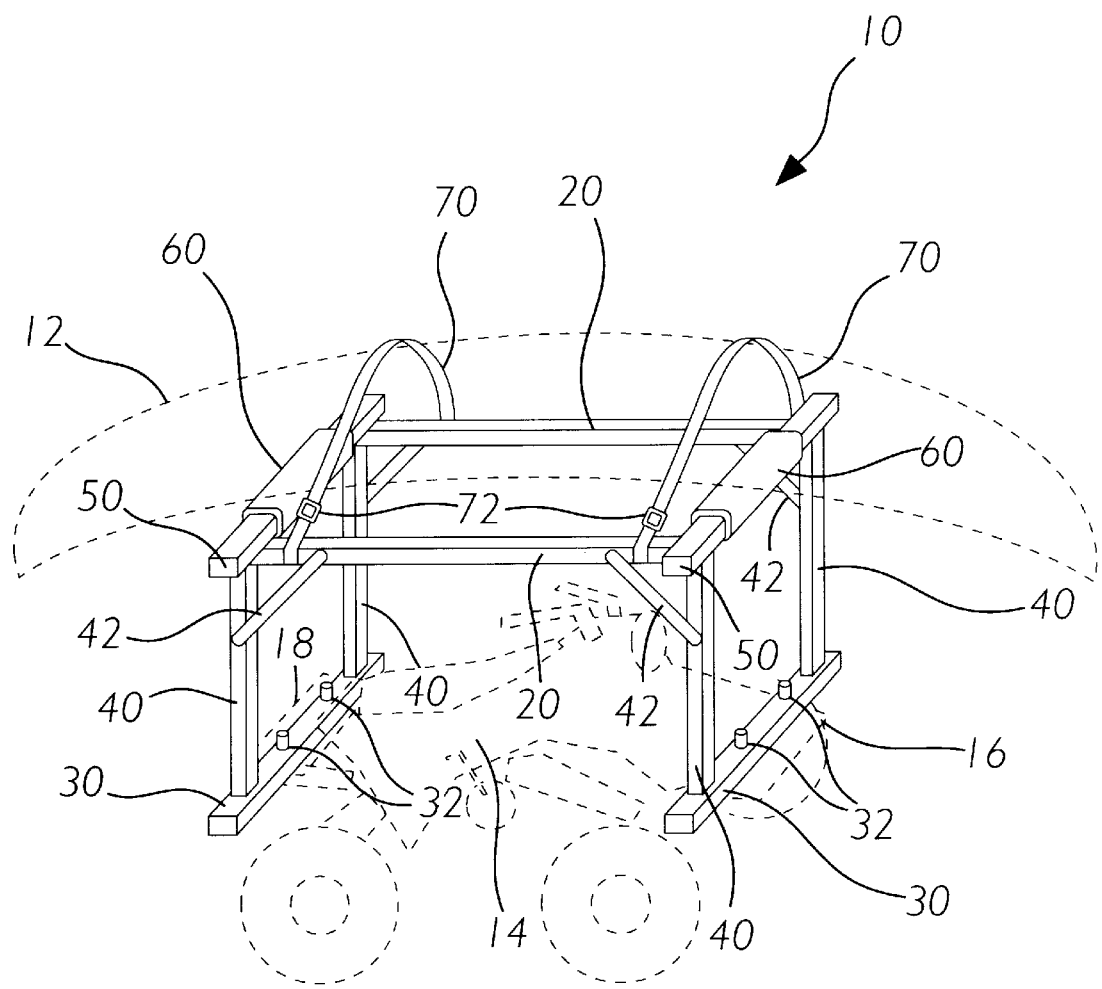
FIG. 1 is an upper perspective view of the present invention attached to an ATV.

Turning now descriptively to the drawings, in which similar reference characters denote similar elements throughout the several view, FIGS. 1 through 4 illustrate a canoe carrier system 10, which comprises a pair of base members 30, a plurality of support members 40 extending vertically from the base members 30, a pair of elongated members 20 extending between the support members 40 longitudinally, a pair of cross members 50 attached between the support members 40 traversely to the elongated members 20, and a plurality of fastener straps 70 secured to the elongated members 20 for surrounding a canoe 12 or kayak. A pair of padding members 60 are secured about cross members 50 for protecting the canoe 12. A pair of fasteners 32 and clamps 34 are attached to each of the base members 30 for attaching to the front rack 16 and rear rack 18 of the ATV 14.

Figure 3:
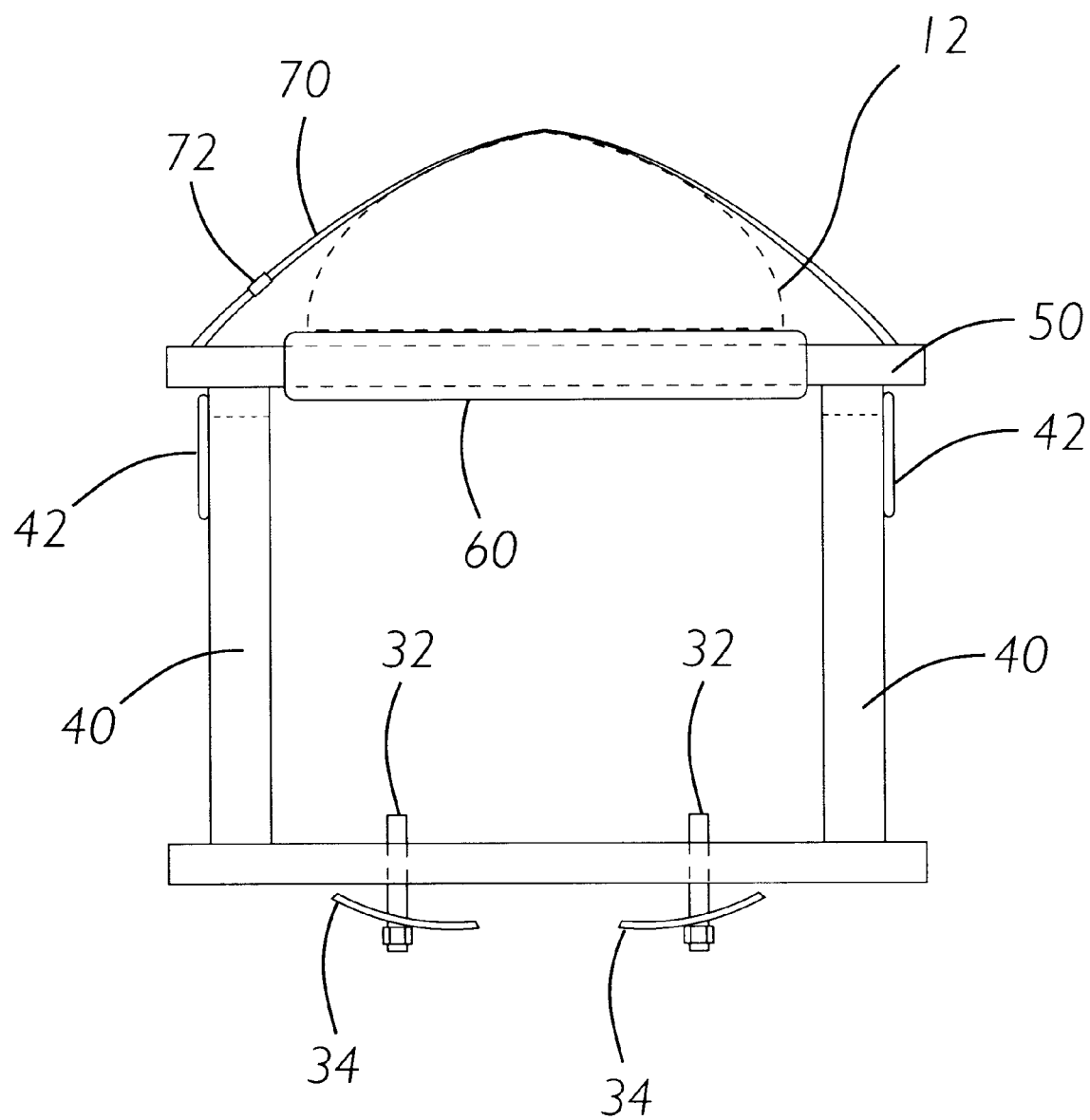
FIG. 3 is a front view of the present invention with a canoe attached thereto.

As best shown in FIG. 1 of the drawings, the pair of base members 30 have a length approximately the width of the front rack 16 and the rear rack 18 of the ATV 14. A pair of fasteners 32 are rotatably positioned within each of the base members 30 as shown in FIGS. 1 and 3 of the drawings. A pair of clamps 34 are attached to the fasteners 32 for engaging the bar members of the front rack 16 and the rear rack 18 when the fasteners 32 are tightened.

Figure 4:
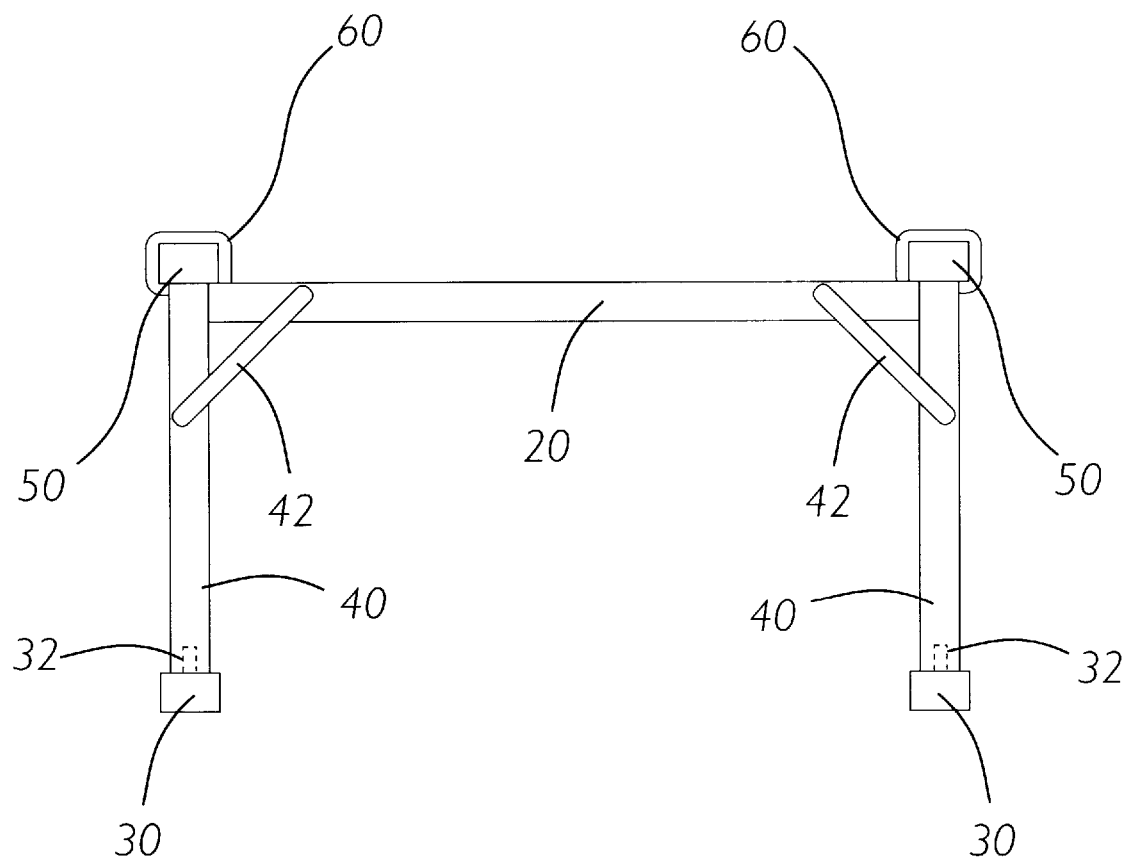
FIG. 4 is a side view of the present invention.

As shown in FIG. 1 of the drawings, a pair of support members 40 are attached near the distal ends of each of the base members 30. The support members 40 extend vertically from the base members 30 as best shown in FIGS. 3 and 4 of the drawings.

Figure 2:
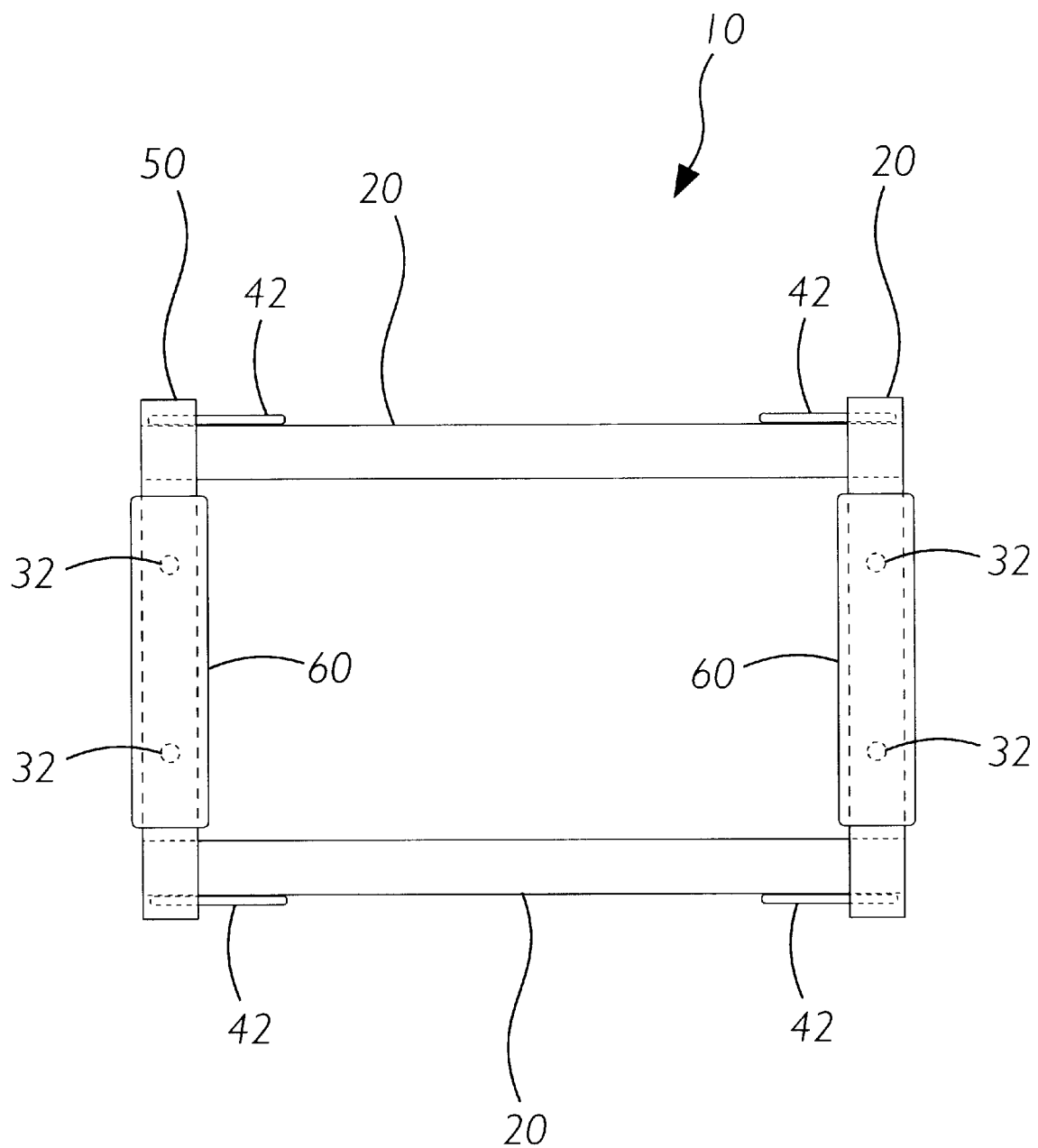
FIG. 2 is a top view of the present invention.

As best shown in FIG. 2 of the drawings, a pair of cross members 50 are secured between each of the pairs of support members 40. A pair of padding members 60 are preferably attached about the cross members 50 for protecting the canoe 12 during transportation. The padding members 60 may be constructed of any well-know padding material such as foam rubber or cloth.

As best shown in FIGS. 1 and 2 of the drawings, a pair of elongated members 20 extend between each of the pairs of support members 40. As shown in FIGS. 1 and 4 of the drawings, a pair of support braces 42 are attached between each of the elongated members 20 and the support members 40 for added support during transportation.

As shown in FIGS. 1 and 3 of the drawings, a pair of fastener straps 70 are secured to the pair of elongated members 20 for retaining the canoe 12 during transportation. The fastener straps 70 include a corresponding pair of buckles 72 for allowing adjustment of the length of the fastener straps 70 and for securing the fastener straps 70 about the canoe 12 during usage.

In use, the user first positions the canoe carrier system 10 so that the base members 30 are juxtaposed to the front rack 16 and the rear rack 18 of the ATV 14. The user then positions the clamps 34 below a bar member under the racks 16, 18 and then tightens the fasteners 32 so as to retain the canoe carrier system 10 to the ATV 14. The user then positions the canoe 12 upon the cross members 50 as best shown in FIG. 1 of the drawings. The user then adjusts and positions the fastener straps 70 about the canoe 12 for retaining the canoe 12 in the desired position. The user then is able to drive the ATV 14 with the canoe 12 directly supported above them. After reaching the remote location, the user simply removes the fastener straps 70 and is able to remove the canoe 12 for usage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A canoe carrier system, comprising:

a first base member;

a second base member positioned parallel to said first base member;

an attaching means for removably securing said first base member to a front rack and for removably securing said second base member to a rear rack of an ATV;

a plurality of support members attached to said first base member and said second base member; and an upper support structure attached to said plurality of support members for supporting a canoe.

2. The canoe carrier system of claim 1, wherein said attaching means comprises:

a plurality of fasteners rotatably positioned within said first base member and said second base member; and a corresponding plurality of clamps connected to said plurality of fasteners for engaging a bar of said first rack and said second rack of said ATV.

3. The canoe carrier system of claim 1, wherein said upper support structure comprises:

a pair of elongated members; and a pair of cross members extending between said pair of elongated members.

4. The canoe carrier system of claim 1, including a means for securing said canoe to said upper support structure.

5. The canoe carrier system of claim 3, including a pair of padding members that respectively surround said pair of cross members.

6. The canoe carrier system of claim 4, wherein said means for securing said canoe comprises a plurality of straps.

7. The canoe carrier system of claim 6, wherein each of said plurality of straps include a buckle.

8. The canoe carrier system of claim 3, a plurality of support braces between said support members and said elongated members.

9. A canoe carrier system, comprising:

a first base member comprised of a tubular structure;

a second base member comprised of a tubular structure positioned parallel with respect to said first base member;

an attaching means for removably securing said first base member to a front rack and for removably securing said second base member to a rear rack of an ATV;

a plurality of support members attached to said first base member and said second base member, wherein said plurality of support members are comprised of a tubular structure; and an upper support structure attached to said plurality of support members for supporting a canoe, wherein said upper support structure is comprised of a tubular structure.

10. The canoe carrier system of claim 9, wherein said attaching means comprises:

a plurality of fasteners rotatably positioned within said first base member and said second base member; and a corresponding plurality of clamps connected to said plurality of fasteners for engaging a bar of said first rack and said second rack of said ATV.

11. The canoe carrier system of claim 9, wherein said upper support structure comprises:

a pair of elongated members; and a pair of cross members extending between said pair of elongated members.

12. The canoe carrier system of claim 9, including a means for securing said canoe to said upper support structure.

13. The canoe carrier system of claim 11, including a pair of padding members that respectively surround said pair of cross members.

14. The canoe carrier system of claim 12, wherein said means for securing said canoe comprises a plurality of straps.

15. The canoe carrier system of claim 14, wherein each of said plurality of straps include a buckle.

16. The canoe carrier system of claim 11, a plurality of support braces between said support members and said elongated members.

17. A canoe carrier system, comprising:

a first base member comprised of a tubular structure;

a second base member comprised of a tubular structure positioned parallel with respect to said first base member;

an attaching means for removably securing said first base member to a front rack and for removably securing said second base member to a rear rack of an ATV;

a plurality of support members attached to said first base member and said second base member, wherein said plurality of support members are comprised of a tubular structure an upper support structure attached to said plurality of support members for supporting a canoe, wherein said upper support structure is comprised of a tubular structure;

wherein said attaching means comprises:
a plurality of fasteners rotatably positioned within said first base member and said second base member; and
a corresponding plurality of clamps connected to said plurality of fasteners for engaging a bar of said first rack and said second rack of said ATV;

wherein said upper support structure comprises:
a pair of elongated members; and
a pair of cross members extending between said pair of elongated members;

a means for securing said canoe to said upper support structure, wherein said means for securing said canoe comprises a plurality of straps;

a pair of padding members that respectively surround said pair of cross members; and a plurality of support braces between said support members and said elongated members.

* * * * *